April 16, 1963 J. C. CRATES ETAL 3,085,775

DROP CLIP

Filed July 24, 1961

INVENTORS
J. C. CRATES and
R. E. POTTER

BY G. Yates Dowell

ATTORNEY 3,085,775
DROP CLIP

James C. Crates, 1509 Lilac Road, Charlotte, N.C., and Ronald E. Potter, 2007 N. Duke St., Durham, N.C.

Filed July 24, 1961, Ser. No. 126,331
4 Claims. (Cl. 248—61)

This invention relates to communications and more particularly to the connecting of wires from an aerial telephone cable to subscribers along the line.

In providing service the telephone companies have a network of aerial cables across the country and along the streets and roadways adjacent to dwellings and other buildings in which telephone subscribers are located. The distances between adjacent subscribers along the line vary greatly, some in rural districts being miles apart and others in urban areas being congested.

In order to eliminate the necessity for opening the protective covering on the telephone cable to make a connection opposite to each subscriber in urban areas, it has been the practice to provide a cable terminal or connecting device for a number of subscribers from which leads are connected to the subscribers' instruments. Such leads require support. In view of the difficulty of linemen working at elevations above the ground and under varying conditions, it is desirable that such supports and the system for connecting the leads from the subscriber's instrument to the cable terminal be as simple as possible, adapted to withstand weathering and unfavorable conditions over a long period of time and not destructive of the cable; otherwise the maintenance problem would become intolerable.

Heretofore, it has been proposed to employ clamping devices which were attached by means of fasteners to the supporting or messenger cable of the telephone line. Such clamps depended upon fasteners to apply the necessary force for holding to the supporting cable. Furthermore, such clamps tended to twist the cable and hence were undesirable where such twisting action would damage the cable. Also, such mechanical clamps in certain instances caused the puncturing of the jacket or covering on the cable, thus permitting the entrance of foreign substances including moisture and water.

Figure 1:
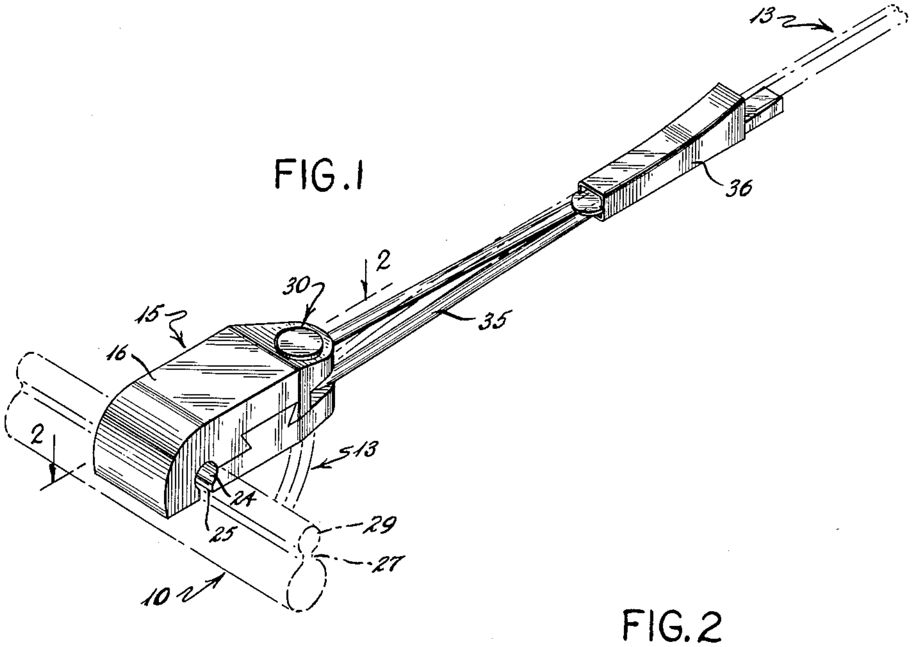
Figure 2:
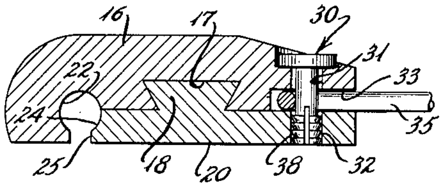
Figure 3:
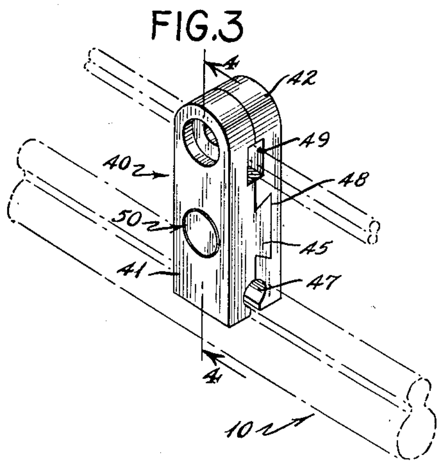

Accordingly, it is an object of the present invention to provide supports for the drop wires or leads to the subscribers' telephones from the main line and which are simple, lightweight, inexpensive and easy to use, and do not tend to damage the cable. These and other objects will become apparent from the following description in conjunction with the accompanying drawings in which:

FIG. 1 is a perspective of a device in accordance with the present invention and illustrating the manner of use;

FIG. 2, a section to an enlarged scale on the line 2—2 of FIG. 1;

FIG. 3, a perspective of a modification; and

Figure 4:
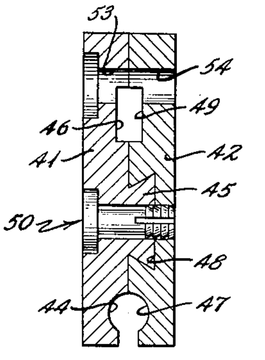

FIG. 4, a section to an enlarged scale on the line 4—4 of FIG. 3.

Briefly stated, the invention includes interfitting supporting members which can be securely connected together by their interconnecting parts and which engage the cable securely without the necessity for depending upon compressive action developing from fasteners. The separable parts may be interconnected and engaged with the cable without the use of tools, thereby simplifying its use and obviating the necessity for stocking and carrying special tools. Additionally, the device is of a configuration which does not tend to abrade or puncture the cable and which does not tend to twist the same; instead, the device is so constructed that the pull caused by the subscriber's drop line is directly in line with the core or axis of the supporting cable, thus obviating the tendency to rub against the conducting cable, with the possibility of puncturing the same. A simple pin serves the dual purpose of holding the supporting wire to the drop line and of preventing inadvertent disassembly of the parts.

A modified two-piece device may be employed to support the drop wire along a length of the main cable, such similar device consisting of two interfitting parts which engage the cable and the drop wire.

With further reference to the drawing, there is illustrated an aerial cable 10 supported at spaced locations by poles (not shown). At intervals along the cable connections are made to drop lines 13 of subscribers.

Although the invention may be used with various types of cable, it is particularly adapted for use with the figure 8 type, in which the supporting strand is jacketed with the conductors in a unitary plastic sheath.

In order to support the drop line on the cable at the point nearest to the subscriber, the present invention provides a connector 15. The connector has a main part 16 with a dovetail slot 17 for receiving a dovetail 18 of a mating member 20. Although various materials may be used in the construction of parts 16 and 20, these are preferably made of a relatively hard plastic, such as rigid polyvinyl chloride. The member 16 has at its forward end a recess 22 extending approximately 270 degrees, the member 20 having an arcuate portion 24 cooperating with the recess 22 to form the major portion of the remaining part of the circumference. As indicated in the drawings, however, a slot 25 remains after the two parts are joined, said slot receiving the web 27 of the cable, the supporting portion 29 thereof being received within the recess 22 and arcuate portion 24 of the parts. The radius of the recess 22 is dimensioned so that it is a snap fit over the supporting cable 29, thereby locating the device on the cable and resisting movement thereon.

After sliding assembly of the parts 16 and 20, their disassembly may be prevented by insertion of a pin 30 through the aligned apertures 31 and 32, respectively, in the parts 16 and 20. The pin 30 may be constructed in various ways, but preferably is bifurcated and has projections 38 which assist in holding it against inadvertent dislodgment.

Part 16 has a notch 33 providing a space between the parts 16 and 20 when they are assembled to receive the loop of a supporting wire 35 for a drop wire clamp 36, well known to the art, through which the drop lines are passed and clamped thereto.

The slot provided by notch 33 is substantially coplanar with the axis of the recess 22, whereby the pull of the wire 35 is resisted directly by the supporting wire 29 and without any substantial twisting of the cable. Hence, tendency to puncture the cable, as with previous supporting devices, is eliminated.

Although the device is particularly adapted for use on plastic covered supporting cable, it is also adapted for use upon uncovered cable.

In many installations the subscriber's drop wire may be passed directly from the supporting parts described to a cable terminal. However, in other installations, particularly where subscribers are located close together, it may be desirable to pass a drop wire along the cable for some distance to reach a cable terminal. In order to accomplish the latter, it is desirable that additional supporting means be provided for the drop wire along the cable. In the modification of FIGS. 3 and 4 the connecting member 40 has mating parts 41 and 42. Part 41 has an arcuate recess 44 adjacent one end, an intermediate male dovetail 45 and a recess 46 adjacent to its other end. Similarly, part 42 has an arcuate recess 47 which cooperates with recess 44, a dovetail groove 48 for receiving the part 45 and a slot 49 cooperating with slot 46 of the part 41.

The parts may be slidably united by engaging the parts of the dovetail and held in position by pin 50 which may be like pin 30. If desired to use the device of FIGS. 3 and 4 to support a drop wire clamp 36, a pin 52 may be inserted for this purpose through the registering openings 53, 54 in the parts 41 and 42, respectively, the space provided between recesses 46 and 51 permitting passage of the drop wire clamp wire 35.

Where the support 40 is used to mount the drop wire along the cable it is positioned with the supporting cable 29 between the recesses 44 and 47 and with the drop wire 35 between the recesses 46 and 49. As many of the devices as may be necessary are used to support the drop wire at spaced intervals along the aerial cable.

Accordingly, it will be understood that the invention includes a pair of mating elements which may be joined by their interlocking parts in a sliding fit and which engage the supporting cable of a telephone cable assembly and which are united against disassembly by a pin passing therethrough. In one embodiment the pin serves as an anchor for a supporting wire from a drop wire clamp. In another embodiment, instead of using such pin to support the drop wire clamp, the space may be used to hold a drop wire running parallel to the cable assembly.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A drop wire support for mounting on one cable of a dual cable assembly within a unitary jacket, comprising an L-shape main member and a relatively flat mating member at the front of the L and above the offset portion thereof, said members having slidably engageable interfitting portions intermediate their ends and extending from side-to-side of the members, said portions being engageable by relative sidewise movement of the members, the main member having a partial cylindrical recess on its inner side at the junction of the L and extending from side-to-side of the member in both portions of the L, the mating member having a partial cylindrical recess at its end adjacent to the junction and forming an extension of the recess of said main member, said recesses being adapted to receive said one cable, the abutting extremities of said members adjacent to said recess being in spaced relation to provide a slot for the web of the cable jacket, the main member having a relatively flat recess at its other end facing the mating member, said members having aligned apertures at their ends remote from said junction and passing through said flat recess, and a pin received in said apertures, said pin having friction means for retaining it against dislodgement.

2. The invention of claim 1, said relatively flat recess being substantially coplanar with the axis of said cylindrical recess.

3. A drop wire support comprising a main clamping member having an arcuate recess adjacent to one end, said recess extending approximately 270 degrees, a groove for a dovetail joint intermediate its one end and a recess at its opposite end, and a mating member comprising a relatively flat member having a male dovetail projecting from its intermediate portion for reception in the groove of the main member, an arcuate recess at its forward end for cooperation with the recess of said main portion, the rear portions of said members having aligned apertures for the reception of a pin to prevent relative motion therebetween.

4. The invention described in claim 3 in which said main portion is L-shaped, a substantial part of the end defining the recess being positioned in the offset portion of the L.

References Cited in the file of this patent

UNITED STATES PATENTS

| | | |
|---|---|---|
| 498,776 | Englund | June 6, 1893 |
| 1,212,708 | Steinberger | Jan. 16, 1917 |
| 1,360,006 | Morgan | Nov. 23, 1920 |
| 1,735,131 | Schaake | Nov. 12, 1929 |